(12) United States Patent
Spiessl et al.

(10) Patent No.: US 10,262,433 B2
(45) Date of Patent: Apr. 16, 2019

(54) DETERMINING THE POSE OF A HEAD MOUNTED DISPLAY

(71) Applicant: Bayerische Motoren Werke Aktiengesellschaft, Munich (DE)

(72) Inventors: Wolfgang Spiessl, Munich (DE); Matthias Roland Kaufmann, Unterschleissheim (DE); Michael Graef, Graefelfing (DE); Markus Gsinn, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 23 days.

(21) Appl. No.: 15/453,357

(22) Filed: Mar. 8, 2017

(65) Prior Publication Data

US 2017/0178359 A1 Jun. 22, 2017

Related U.S. Application Data

(63) Continuation of application No. PCT/EP2015/069104, filed on Aug. 20, 2015.

(30) Foreign Application Priority Data

Sep. 9, 2014 (DE) .................. 10 2014 217 961

(51) Int. Cl.
*G06T 7/00* (2017.01)
*G06T 7/73* (2017.01)
(Continued)

(52) U.S. Cl.
CPC .............. *G06T 7/73* (2017.01); *B60K 35/00* (2013.01); *G02B 27/017* (2013.01); *G06F 3/012* (2013.01);
(Continued)

(58) Field of Classification Search
CPC .............. G06T 7/00; G02B 27/00; G06F 3/00
(Continued)

(56) References Cited

U.S. PATENT DOCUMENTS 7,447,330 B2* 11/2008 Yamasaki ................ G02B 3/14
  382/100
7,549,750 B2* 6/2009 Nakamura ........... A61B 3/0041
  351/237
(Continued)

FOREIGN PATENT DOCUMENTS

DE 11 2005 001 825 T5 5/2007
EP 2 254 023 A2 11/2010
(Continued)

OTHER PUBLICATIONS

International Search Report (PCT/ISA/210) issued in PCT Application No. PCT/EP2015/069104 dated Dec. 1, 2015 with English translation (seven pages).
(Continued)

*Primary Examiner* — Abolfazl Tabatabai
(74) *Attorney, Agent, or Firm* — Crowell & Moring LLP

(57) ABSTRACT

Data eyeglasses include a first display, a camera, and an analyzing unit. The data eyeglasses is configured to: record the surroundings of the data eyeglasses via the camera, detect an image displayed by a second display in the recordings of the camera; detect that the displayed image has a marker for determining the pose of the data eyeglasses; detect the marker; and determine the pose of the data eyeglasses by use of the detected marker.

8 Claims, 2 Drawing Sheets

(51) Int. Cl.
*G06F 3/01* (2006.01)
*G02B 27/01* (2006.01)
*B60K 35/00* (2006.01)

(52) U.S. Cl.
CPC ............... *B60K 2350/1052* (2013.01); *G02B 2027/0138* (2013.01); *G02B 2027/0187* (2013.01); *G06T 2207/30204* (2013.01); *G06T 2207/30268* (2013.01)

(58) Field of Classification Search
USPC ......................................................... 382/103
See application file for complete search history.

(56) References Cited

U.S. PATENT DOCUMENTS

| | | | | |
|---|---|---|---|---|
| 2005/0175234 | A1* | 8/2005 | Sakamoto | A47F 10/00 382/154 |
| 2014/0063060 | A1 | 3/2014 | Maciocci et al. | |
| 2015/0062167 | A1 | 3/2015 | Park et al. | |

FOREIGN PATENT DOCUMENTS

| | | |
|---|---|---|
| WO | WO 00/52563 A1 | 9/2000 |
| WO | WO 2005/124429 A1 | 12/2005 |
| WO | WO 2013/012914 A2 | 1/2013 |

OTHER PUBLICATIONS

German-language Written Opinion (PCT/ISA/237) issued in PCT Application No. PCT/EP2015/069104 dated Dec. 1, 2015 (six pages0.

German Search Report issued in counterpart German Application No. 10 2014 217 961.0 dated Jun. 25, 2015 with partial English translation (13 pages).

Broll, "Augmentierte Realitaet, 8.2 Tracking. In: Virtual und Augmented Reality (VR/AR)", 2013, pp. 252-264, Springer, ISBN 978-3-642-28903-3.

* cited by examiner

DETERMINING THE POSE OF A HEAD MOUNTED DISPLAY

CROSS REFERENCE TO RELATED APPLICATIONS

This application is a continuation of PCT International Application No. PCT/EP2015/069104, filed Aug. 20, 2015, which claims priority under 35 U.S.C. § 119 from German Patent Application No. 10 2014 217 961.0, filed Sep. 9, 2014, the entire disclosures of which are herein expressly incorporated by reference.

BACKGROUND AND SUMMARY OF THE INVENTION

The invention relates to data eyeglasses and to a process for determining the pose of data eyeglasses.

Nowadays, data eyeglasses (sometimes also referred to as a head-mounted display, HMD) are known, with the aid of which information can be displayed to the wearer of the data eyeglasses. In this case, the data eyeglasses are worn on the head like conventional eyeglasses, which are used as a visual aid. However, in contrast to conventional eyeglasses, the data eyeglasses include a display which, when the data eyeglasses are worn, is arranged close to the user's eye or eyes. The display may comprise two partial displays, specifically one for each eye. In the display, information can be displayed to the user in the form of text, graphic representations or mixtures thereof. In particular, the display can be partially transparent, thus may be further developed such that the wearer can also recognize the environment behind the display. Particularly preferably, the information or instructions or images are contact-analogously displayed to the wearer, which is sometimes also called "augmented reality". In this case, the information is displayed to the wearer of the data eyeglasses in a location that is oriented according to the location of an object in the environment, thus, for example, adjoining the object or superimposed on the latter. For implementing the contact analogy, typically the position of the object in the environment and the pose of the data eyeglasses in relation to the object have to be known, thus the position of the data eyeglasses and the alignment of the data eyeglasses.

Data eyeglasses have become known which also include a camera, which takes pictures in the viewing direction of the wearer of the data eyeglasses; see, for example, International Patent Document WO 2013/012914.

Data eyeglasses can also be used in vehicles in order to display contact-analog information. This information may concern other traffic participants or objects in the vehicle. In order to be able to display contact-analog information, the pose of the data eyeglasses also has to be known here in most cases.

Inertial sensors (acceleration, gyroscope, compass) are known, which can determine a relative orientation of an electronic device, among other things, typically also of data eyeglasses. However, inertial sensors are subject to noise and to a temporal drift. They are mainly unsuitable in the vehicle because of the proper motion of the vehicle, since only the superposition of the vehicle motion and head motion is sensed. These sensors do not supply information regarding a position, but only concerning the relative orientation. An absolute referencing of the orientation requires a magnetometer, which cannot be used in the vehicle context because of strong interferences.

It is an object of the present invention to provide data eyeglasses by which the pose of the data eyeglasses in the vehicle can be determined. Likewise, it is an object of the present invention to achieve this pose determination in vehicles as accurately and technically reliably as possible.

The task of the invention is achieved by data eyeglasses in accordance with embodiments of the invention.

An aspect of the invention relates to data eyeglasses, having a first display, a camera, and electronic computing devices, wherein the data eyeglasses are configured for implementing the steps of photographing the surroundings of the data eyeglasses by use of the camera, detecting an image in the photos of the camera that is displayed by a second display; detecting that the displayed image includes a marker for the pose determination of the data eyeglasses, recognizing the marker, determining the pose of the data eyeglasses by use of the detected marker.

Furthermore, the computing unit may be configured for detecting the second display in the photos of the camera. The alignment and position of the display and thereby of the displayed marker are typically predefined, known or are provided. The determination of the pose can be carried out particularly relative to the alignment and position of the second display. The pose of the data eyeglasses can describe the alignment of the data eyeglasses in a three-dimensional space and the position of the data eyeglasses in a three-dimensional space. The marker may have a part or the full size of the image which, in turn, may fill in essentially the entire second display. The second display is typically a display of the interior of the vehicle, such as an instrument cluster or a display, which is (movably) installed in the dashboard and is used for presenting navigation and infotainment information.

A determination of the pose of the data eyeglasses is disclosed that is based on the photo or the photos of the camera of the data eyeglasses. In order to facilitate the pose determination, a predefined marker is displayed in a display, which marker is suitable for determining the pose of the data eyeglasses and therefore, in particular, therefore represents areas or lines delimited with respect to one another, in some implementations, similar or identical to a QR code. With the aid of the image of the marker in the photo (from the perspective of the camera of the data eyeglasses), knowledge concerning the further development of the marker and the position and alignment of the second display, conclusions can be drawn on the pose of the data eyeglasses. Methods for this purpose are known from the state of the art. However, the marker is displayed in the display in such a fashion that it is not apparent to a person's eye. This can be achieved particularly by using steganography and/or watermarking. However, the marker can be detected by way of the camera of the data eyeglasses (and, as required, by using image processing algorithms).

This permits a robust pose determination, because the absolute pose of the data eyeglasses is determined, which can also be achieved with sufficient precision by use of the camera technology currently available as well as what will be available in the future. Furthermore, no additional installations are required in the vehicle interior as markers for the pose determination. Compared to a system in which the pose of the data eyeglasses would be determined by cameras arranged in the vehicle and then first has to be transmitted to the data eyeglasses, in order to permit a contact-analog representation, the invention disclosed here allows a reduction of the latencies (delays for the adaptation of the contact-analog representation) after head motions. The reason is that the pose of the data eyeglasses is computed in the data eyeglasses themselves and does not first have to be transmitted to the data eyeglasses.

The second display is typically used for a different purpose, specifically for displaying text or graphic based information, such as an information image, that can be perceived by the person. In a typical application, the second display is installed in a dashboard of a vehicle, which second display, within the scope of a display-operating concept, is used for displaying to the driver of the vehicle (or a front passenger) selection menus, maps, navigation instructions or, for example, illustrating graphics or images. As an alternative, the display may also be a so-called instrument cluster, which typically indicates the speed of the vehicle. The presentations provided within the scope of this display-operating concept are not very suitable for photographing and determining the pose of data eyeglasses. The typical presentations are changeable and frequently comprise no clearly delimited geometric shapes. According to the data eyeglasses disclosed here and the described method, a marker is worked into the information image by means of steganography or watermarking and is them embedded. Depending on the information image, a correspondingly fitting embedding of the marker in the information image will be determined. As a result of the embedding, typically the colors and/or the brightness of areas of the information image are changed. A person cannot perceive the embedded marker in the information image; only the information image is visible to the naked eye at typical observation intervals. The marker is predefined and is provided to the data eyeglasses or is stored so that it can be retrieved by the latter. For detecting the marker in the photo of the image, as required, first a process must be used that corresponds to the steganography or water marking process used during the embedding.

In a typical implementation, the pose, thus, the position and alignment, of the second display, is taken into account for determining the pose of the data eyeglasses. The pose of the second display is usually unchangeable, and a one-time or infrequent transmission to the data eyeglasses may therefore be sufficient.

In some implementations, the data eyeglasses are further configured for receiving a notification that the marker is displayed on the second display. The data eyeglasses may also be configured for attempting the detection of the marker only in the cases in which the notification is received or for a defined time period thereafter. This permits the saving of computing capacity and energy, which increases the battery life of the data eyeglasses.

Finally, the data eyeglasses may also be configured for the contact-analog displaying of a representation on the first display as a function of the defined pose of the data eyeglasses. For this purpose, the data eyeglasses receive a presentation to be displayed and the location in the surroundings (or a reference location relative to the position of the second display or of the vehicle), in which the presentation for the user of the data eyeglasses is to appear. Corresponding to the pose determined by the eyeglasses themselves, the presentation is displayed by the data eyeglasses in correspondingly determined positions of the first display (thus, in the display of the data eyeglasses).

Another aspect relates to a vehicle including a display control and a display, wherein the vehicle is configured for implementing the steps of determining an information image to be displayed in the display; changing the information image such that a marker is embedded therein that is not visible to an average unaided human eye, wherein the marker is designed such that it permits the pose determination of data eyeglasses by use of a camera photo of the data eyeglasses; and displaying the changed information image. The changed information image is therefore the image that is displayed in the information display or the instrument cluster.

Other objects, advantages and novel features of the present invention will become apparent from the following detailed description of one or more preferred embodiments when considered in conjunction with the accompanying drawings.

BRIEF DESCRIPTION OF THE DRAWINGS

Identical reference symbols relate to corresponding elements in all figures.

DETAILED DESCRIPTION OF THE DRAWINGS

Figure 1:
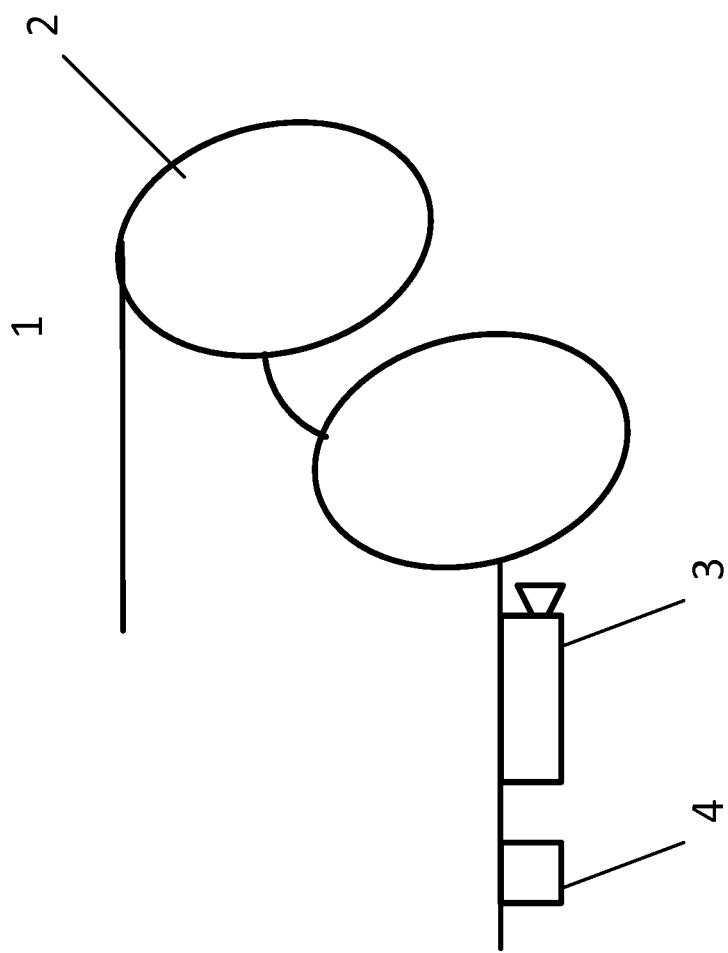
FIG. 1 is a schematic view of data eyeglasses according to an embodiment of the invention.

FIG. 1 is a schematic view of data eyeglasses 1 according to an embodiment. The data eyeglasses 1 include two partial displays 2, one respectively for the left and the right eye. The data eyeglasses further include a camera 3 and an analyzing (computing) unit 4. The data eyeglasses 1 have an accumulator (battery) and a WiFi module for wireless radio transmission, which are not shown in FIG. 1. The data eyeglasses are worn on the head of the user like a typical visual aid, wherein the data eyeglasses rest on the nose and the ears. The camera 3 is aligned in the viewing direction of the wearer (not shown) of the data eyeglasses 1 and essentially photographs the field of vision of the wearer of the data eyeglasses 1. The camera 3 continuously takes photographs, therefore, for example, every 16 ms, in the visible range of light.

Figure 2:
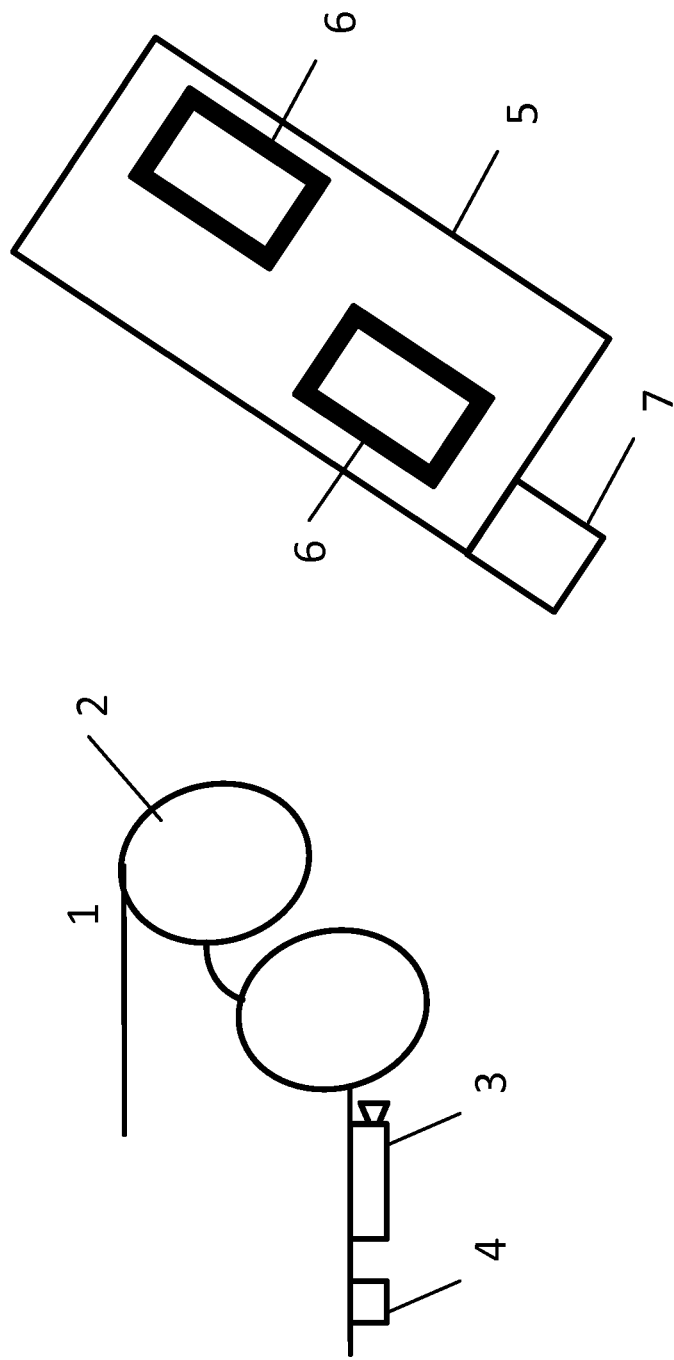
FIG. 2 is a schematic view of the use of data eyeglasses in a vehicle according to an embodiment of the invention.

FIG. 2 is a schematic view of the use of data eyeglasses in a vehicle according to an embodiment. The data eyeglasses 1 and an OLED display 5 ("second display") are situated in the vehicle (not shown in FIG. 1), the latter being installed in the dashboard of a vehicle. The display 5 is acted upon with commands by a control unit 7. In the vehicle, the display 5 first has the purpose, as the display within the scope of a display-operating concept, to display menu structures, selections and graphic elements for the driver of the vehicle, thus information images. For this purpose, the display 5 is controlled at a rate of 50 Hz with respective images to be displayed.

The displayed images contain a marker which is embedded in the respective information image by use of steganography. The marker is prestored. An occupant of the vehicle cannot see the embedded marker with the unaided eye. The information image with the embedded marker is not illustrated in FIG. 2.

FIG. 2 schematically indicates the marker 6, as detected by the data eyeglasses 1 after a corresponding image processing (according to the steganography method by which it was embedded). The marker 6 has two clearly delimited rectangles in sharp contrast with the white background. By means of this pattern, the pose of the data eyeglasses can be precisely determined in the subsequent processing. The control unit 7 transmits via WiFi to the analyzing unit 4 that a marker is displayed by way of the steganography method. Based on this received information, the analyzing unit 4 examines the photo stream received from the camera 3 in order to detect the marker 6 and, based on the latter, to determine the pose of the data eyeglasses in relation to the display 5.

From a vehicle computing unit having a radio module of the vehicle (not shown), the data eyeglasses 1 receive the position of an object to be marked in the surroundings. The position of the object to be marked is indicated relative to the display 5. Furthermore, the vehicle transmits the shape of the contact-analog representation. The analyzing unit 4 determines the location of the display 2 of the data eyeglasses 1 in which the contact-analog representation is to be displayed. The data eyeglasses show the representation in the determined location, whereby the representation appears in a contact-analog manner to the wearer of the data eyeglasses.

The control unit 7 is configured such that the embedded marker will not be displayed immediately after a user's operating input. Thus, for example, after an input, the embedding of the marker can be delayed for 0.6 s. It is to be assumed that the user intensively views the display 5 immediately after an input. In this situation, the user could notice the embedding of the marker 6, which is therefore advantageously avoided. Furthermore, the embedding of the marker 6 could always be waived or delayed when image changes take place with respect to the display operating concept, thus, for example, when scrolling or changing into a different function of the vehicle (navigation to radio, media pieces to settings, etc.)

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Data eyeglasses, comprising:
  a first display arranged in a lens of the data eyeglasses;
  a camera arranged on a frame of the data eyeglasses in a viewing direction of a user of the data eyeglasses; and
  an analyzing unit arranged adjacent to the camera,
  wherein the data eyeglasses are configured to execute processing to:
    photograph surroundings of the data eyeglasses by use of the camera,
    detect an image, displayed by a second display arranged apart from the data eyeglasses, in a photo of the camera,
    detect that the displayed image comprises a marker for pose determination of the data eyeglasses,
    detect the image of the marker in the photo, and
    determine, by the analyzing unit, the pose of the eyeglasses by use of the detected image of the marker.

2. The data eyeglasses according to claim 1, wherein
  the image comprises the marker and an information image,
  the information image is perceptible by a human eye, and
  the marker is embedded in the information image so as not to be perceived by the human eye.

3. The data eyeglasses according to claim 2, wherein
  the marker changes colors and/or brightness of areas of the information image.

4. The data eyeglasses according to claim 1, wherein
  for determining the pose of the data eyeglasses, the position and alignment of the second display is taken into account.

5. The data eyeglasses according to claim 1, wherein the data eyeglasses are further configured to execute processing to:
  receive a notification that the marker is displayed in the second display.

6. The data eyeglasses according to claim 5, wherein the data eyeglasses are further configured to execute processing to:
  contact-analog display a representation on the first display as a function of the defined pose of the data eyeglasses.

7. A method for determining a pose of data eyeglasses, wherein the method comprises the acts of:
  photographing surroundings of the data eyeglasses by use of a camera of the data eyeglasses that is arranged on a frame of the data eyeglasses in a viewing direction of a user of the data eyeglasses;
  detecting an image displayed by a second display in photos of the camera;
  detecting, by an analyzing unit arranged adjacent to the camera, that the displayed image comprises a marker for the pose determination of the data eyeglasses;
  detecting the marker; and
  determining, by the analyzing unit, the pose of the data eyeglasses based on the detected marker.

8. A vehicle, comprising a display control and a display, wherein the display control executes processing to:
  determine an information image to be displayed in the display;
  change the information image such that a marker is embedded therein, which marker is not visible to an unaided human eye, wherein the marker is designed to permit pose determination of data eyeglasses by use of a photo taken by a camera of the data eyeglasses, the camera being arranged on a frame of the data eyeglasses in a viewing direction of a user of the data eyeglasses; and
  display the changed information image in the display of the vehicle.

* * * * *